Patented July 26, 1932

1,868,593

UNITED STATES PATENT OFFICE

FRITZ BAUMANN, OF LEVERKUSEN-ON-THE-RHINE, GERMANY, ASSIGNOR TO GENERAL ANILINE WORKS, INC., OF NEW YORK, N. Y., A CORPORATION OF DELAWARE

ALUMINUM LAKES OF 1.4-DIHYDROXY- AND 1-AMINO-4-HYDROXY-ANTHRAQUINONE-DISULPHONIC ACIDS

No Drawing. Application filed July 24, 1929, Serial No. 380,767, and in Germany July 31, 1928.

The present invention relates to aluminum lakes of 1.4-dihydroxy-and 1-amino-4-hydroxy-anthraquinone-disulphonic acids.

In accordance with the present invention especially valuable lakes are obtainable by transforming 1.4-dihydroxy- or 1-amino-4-hydroxyanthraquinone - disulphonic acids into the corresponding aluminum lakes according to the usual methods, for instance, by adding aluminum hydroxide to a boiling aqueous solution of the alkali metal salts of the sulphonic acids, or by dissolving the sulphonic acids or their alkali metal salts in water, adding aluminum sulphate, advantageously in excess, heating the mixture to boiling and causing precipitation of the aluminum lakes by the addition of sodium carbonate.

As starting materials I prefer the sulphonic acids of the probable general formula

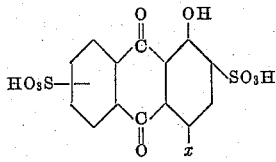

wherein $x$ stands for the hydroxy- or amino group. The preparation of these compounds may be carried out, for instance, by starting with 1-hydroxyanthraquinone being sulphonated in 5-, 6-, 7- or 8 position, introducing a second sulpho group in 2 position, nitrating the disulphonic acid thus obtainable, (the nitro group entering the 4- position), and reducing. 1 amino-4-hydroxyanthraquinone disulphonic acids are thus obtained which can be converted into the corresponding 1.4-dihydroxyanthraquinone disulphonic acids by the corresponding diazo compounds or by oxidation with manganese-dioxide in sulphuric acid solution and boiling up the reaction product with water.

The alumium lakes of these products are reddish-violet to bluish-green powders insoluble in water and are valuable and clear pigment dyestuffs of excellent fastness properties especially to light. Compared with the known aluminum lakes of quinizarine and 1-amino-4-hydroxy-anthraquinone monosulphonic acids, the new lakes are distinguished by an unexpected deepening of their coloration. For instance, the aluminum lakes of quinizarine 2- or 5-sulphonic acids yield a red or ruby colored aluminum lake, whereas the aluminum lake derived from quinizarine-2.5-disulphonic acid possesses a violet coloration. Similarly, the reddish-violet aluminum lake or pigment dyestuff of anthraquinone - 1 - hydroxy-4-amino-anthraquinone-2-sulphonic acid is converted into a bluish-green by the introduction of a second sulphonic acid group.

The following examples illustrate my invention without limiting it thereto:

Example 1

5 parts by weight of potassium quinizarine-2.6-disulphonate are dissolved in 600 parts of water, 75 parts by weight of aluminum sulphate (18% $Al_2O_3$) dissolved in 750 parts by weight of water are added and precipitation of the aluminum lake effected while boiling with 350 parts by weight of a 10% aqueous sodium carbonate solution. Thus is obtained a violet precipitate, which is further worked up in the customary manner. The violet colorings are of extraordinary clarity and excellent fastness.

The quinizarine-2.6-disulphonic acid can be obtained by treating quinizarine-6-sulphonic acid in aqueous solution with sodium sulphite in the presence of pyrolusite. The disulphonic acid crystallizes in the form of its potassium salt in small orange red needles, dissolving in water with an orange yellow coloration, which turns blue on the addition of caustic soda. The sulphuric acid solution is red and on the addition of boric acid becomes more bluish with a yellow fluorescence.

When replacing in this example the quinizarine 2.6-disulphonic acid by quinizarine 2.7-disulphonic acid, an aluminum lake of nearly the same properties is obtained.

Example 2

10 parts by weight of qinizarine-2.5-disulphonic acid are dissolved in 1000 parts of water; after the addition of 1500 parts by weight of aqueous 10% aluminum sulphate solution and heating to boiling the lake or pigment dyestuff is precipitated while boiling with 750 parts by weight of aqueous 10% sodium carbonate solution. The violet precipitate is further heated to boiling for a short time, filtered, washed and dried.

The aluminum lake yields very clear violet colorings of remarkable fastness to light.

The quinizarine-2.5-disulphonic acid is obtainable in the same manner as the above mentioned quinizarine-2.6-disulphonic acid, for instance by treating quinizarine-5-sulphonic acid with sodium sulphite in the presence of an oxidizing agent. The small brick red needles of potassium quinizarine-2.5-disulphonate dissolve in water with an orange yellow coloration, which becomes blue on the addition of a caustic alkali. The substance dissolves in concentrated sulphuric acid with a red coloration, in boro-sulphuric acid with a bluish red coloration and strong fluorescence. The solution in boro-sulphuric acid possesses a pronounced spectrum.

*Example 3*

An 8% aqueous solution containing 3 parts by weight of potassium anthraquinone-1-hydroxy-4-amino-2.8-disulphonate is precipitated with 110 parts by weight of a 10% aqueous paste of aluminum hydroxide and heated to boiling for some time, after which the precipitate is isolated.

The coloring produced is greenish-blue.

Anthraquinone-1-hydroxy-4-amino-2.8-disulphonic acid can be obtained, for example, from anthraquinone-1-hydroxy-8-sulphonic acid by consecutive sulphonation, nitration and reduction. The violet crystals of the potassium salt dissolve in acidified water with a violet coloration and in alkaline water with a greenish-blue coloration. It dissolves in sulphuric acid with a yellowish-green coloration, which turns greenish-blue on the addition of formaldehyde.

I claim:—

1. As new products the aluminum lakes of the compounds of the probable general formula

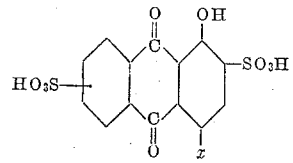

wherein $x$ stands for a substituent of the group consisting of the amino- and hydroxy group, said products forming violet-red to bluish-green powders insoluble in water, being valuable pigment dyestuffs of excellent fastness properties especially to light.

2. As new products the aluminum lakes of the compounds of the probable formula

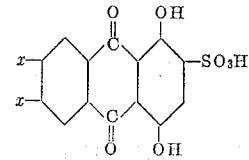

wherein one $x$ stands for hydrogen and the other $x$ for the sulphonic acid group, said products being violet pigment dyestuffs of excellent fastness properties especially to light.

In testimony whereof I have hereunto set my hand.

FRITZ BAUMANN. [L. S.]